4 Sheets—Sheet 1.

T. PIPER.
Machines for Making Wooden Handles.

No. 156,378. Patented Oct. 27, 1874.

4 Sheets--Sheet 2.
T. PIPER.
Machines for Making Wooden Handles.
No. 156,378. Fig. 3 Patented Oct. 27, 1874.
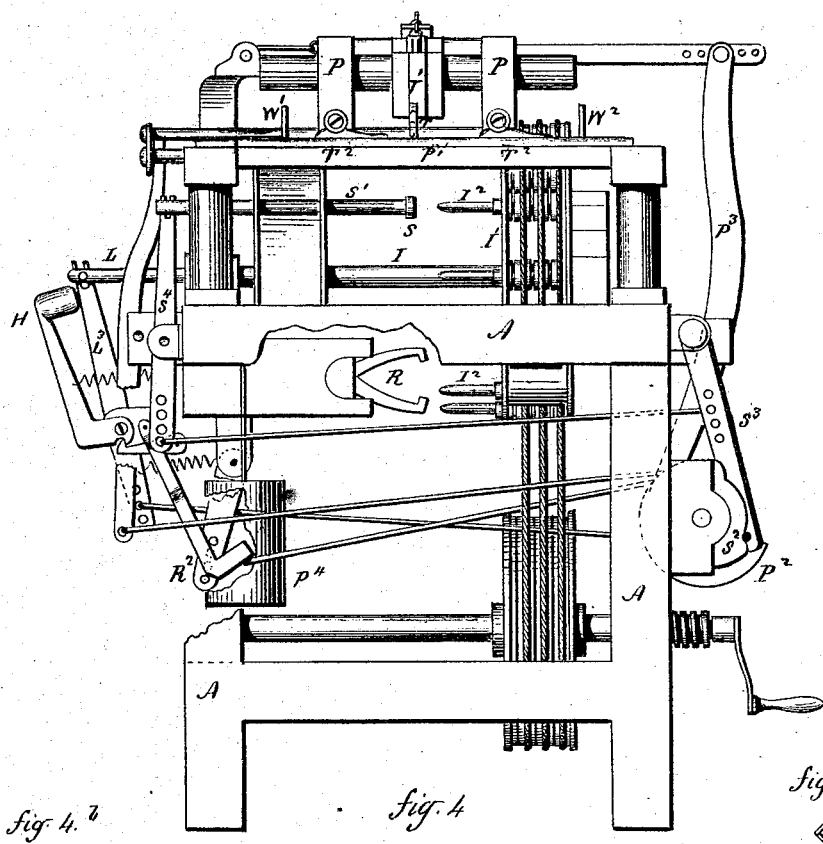
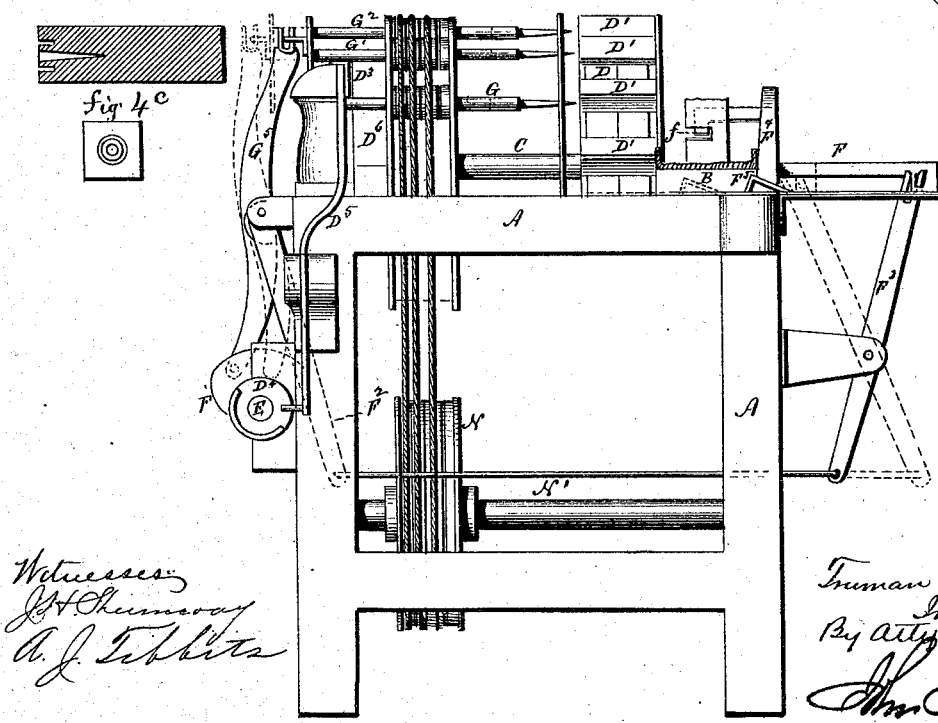
Witnesses:
Truman Piper, Inventor
By atty.

T. PIPER.
Machines for Making Wooden Handles.

No. 156,378. Patented Oct. 27, 1874.

Witnesses: Thomas Piper, Inventor
By atty.

4 Sheets--Sheet 4.

T. PIPER.
Machines for Making Wooden Handles

No. 156,378.   Patented Oct. 27, 1874.

Witnesses

Truman Piper
Inventor
By Atty

UNITED STATES PATENT OFFICE.

TRUMAN PIPER, OF BIRMINGHAM, CONNECTICUT.

IMPROVEMENT IN MACHINES FOR MAKING WOODEN HANDLES.

Specification forming part of Letters Patent No. 156,378, dated October 27, 1874; application filed June 13, 1874.

*To all whom it may concern:*

Be it known that I, TRUMAN PIPER, of Birmingham, in the county of New Haven and State of Connecticut, have invented a new Improvement in Machine for Making Wood Handles; and I do hereby declare the following, when taken in connection with the accompanying drawings and the letters of reference marked thereon, to be a full, clear, and exact description of the same, and which said drawings constitute part of this specification, and represent, in—

Figure 1:
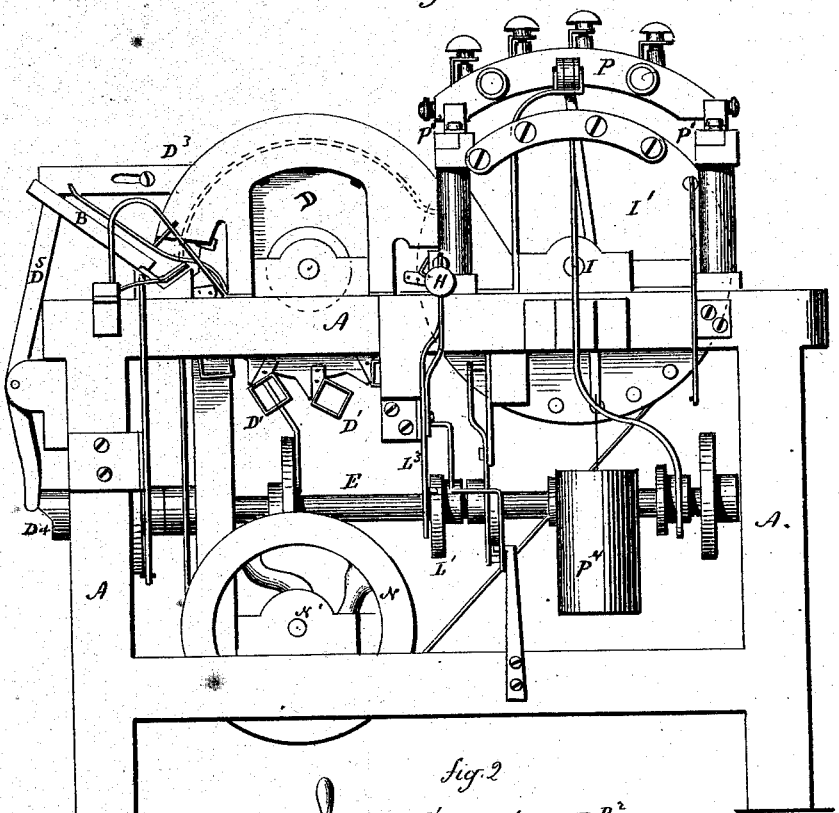
Figure 2:
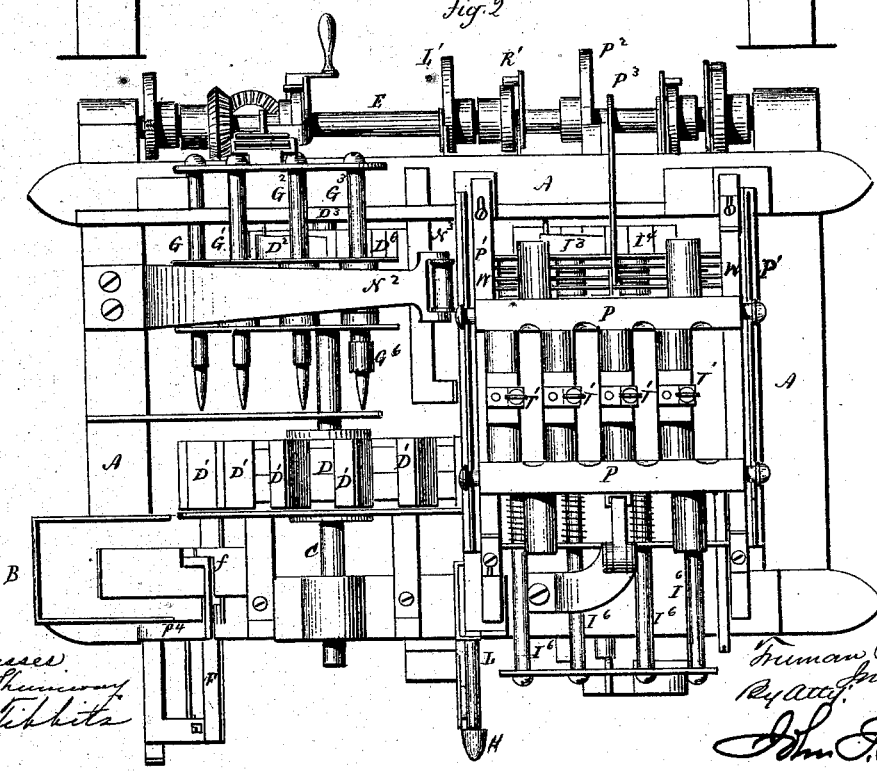
Figure 5:
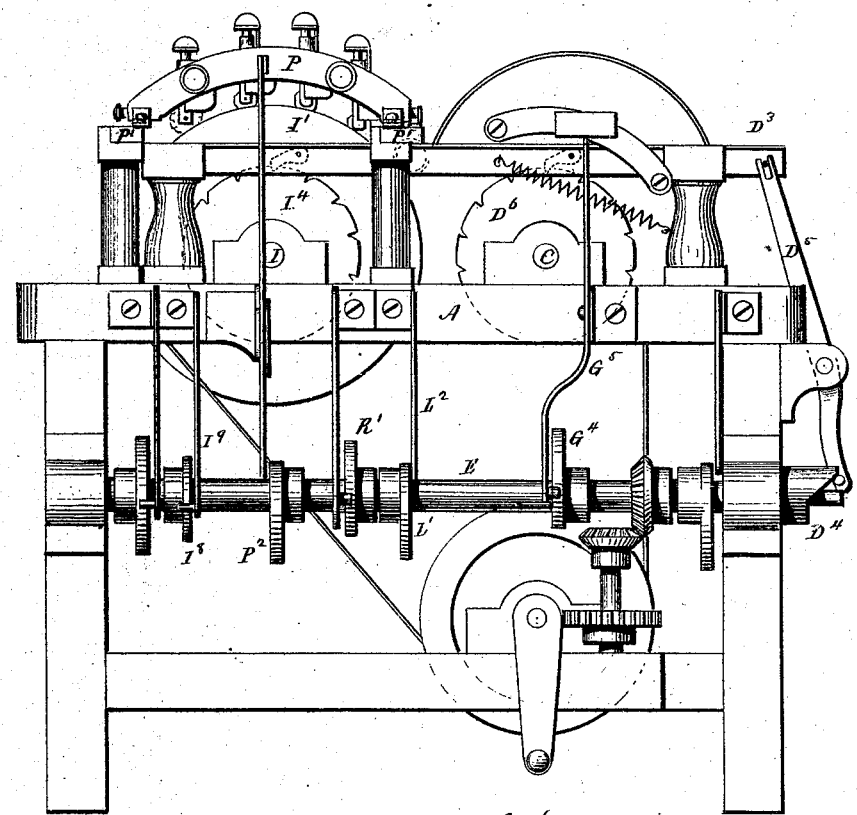

Fig. 1, a side view; Fig. 2, a top view; Fig. 3, an end view; Fig. 4, the reverse; Fig. 5, the opposite side; Figs. 6, 7, 8, and 9, detached views.

This invention relates to a machine for the manufacture of tool-handles, the object being the construction of a machine which, being supplied with a succession of blanks, will automatically pass the said blanks to the several operations required, and discharge the handle finished from the machine; and the invention consists in a combination of mechanism, as hereinafter described, whereby this result is attained.

A is the frame which supports the operative mechanism; B, the hopper, into which the blanks are placed. A portion of this hopper is broken away, as seen in Figs. 1, 2, and 4, to show the feeding mechanism. The inclination of this hopper is sufficient to cause the blanks which are introduced to fall by their own gravity to the lowest point. The blanks are preferably made square in transverse section, only sufficiently large to finish the largest diameter of the handle, and in length according to the handle to be produced. Several of these blanks are placed in the hopper to be successively transferred, as hereinafter described, to be formed into handles. C is a shaft, transverse to the hopper—that is to say, parallel to the blanks which lie in the hopper. On this shaft C is a wheel, D, on the periphery of which are several blank-holders, $D^1$, more or less in number, the blank-holders being parallel with the axis of the wheel, so that, as the wheel revolves, the blanks will pass the mouth of the hopper. An intermittent movement is imparted to this wheel D by means of a pawl, $D^2$, attached to a bar, $D^3$. To this bar a reciprocating movement is imparted by means of a cam, $D^4$, on the shaft E through a lever, $D^5$. A pawl works in a ratchet-wheel, $D^6$, and imparts an intermittent movement to the shaft C, thence to the wheel D, according to the reciprocating movement of the bar $D^3$. Each such intermittent movement presents a new blank-holder, $D^1$, to the mouth of the hopper, as seen in Fig. 4. The lower blank is forced from the hopper into the corresponding blank-holder by means of a slide, F, connected to a cam, $F^1$, on the shaft E through the levers $F^2$ and $F^3$. The slide F, moving to the position denoted in broken lines, Fig. 4, forces the blank longitudinally into the corresponding blank-holder on the wheel D.

In order that the column of blanks may be held back until the transfer of the blank is completed and the slide F returned, a finger, $f$, is hung to a spring, $F^4$. This spring, when the slide F is out, rests upon an incline, $F^5$, on the slide F; but, so soon as the slide moves forward to transfer the blank, this incline passes from beneath the spring, and allows the finger $f$ to fall upon next to the lowest blank, and press with sufficient force to hold back the column. On the return of the slide F, the incline $F^5$ will raise the spring and allow the column to present the lowest blank to the slide F, to be next transferred to the blank-holder, and so on—each successive blank in its turn transferred from the hopper to the blank-holder.

The blank-holders are each in form of a square tube, open at one of its angles, as seen in Fig. 4ᵃ; and, the material of the blank-holder, possessing some degree of elasticity, or a spring-pressure applied thereto, tends to contract the holder, and the holders slightly less in size than the blanks, so that, as the blanks are passed into the holders, the pressure of the blanks upon the holders will be sufficient to hold the blanks in place.

Figure 6:
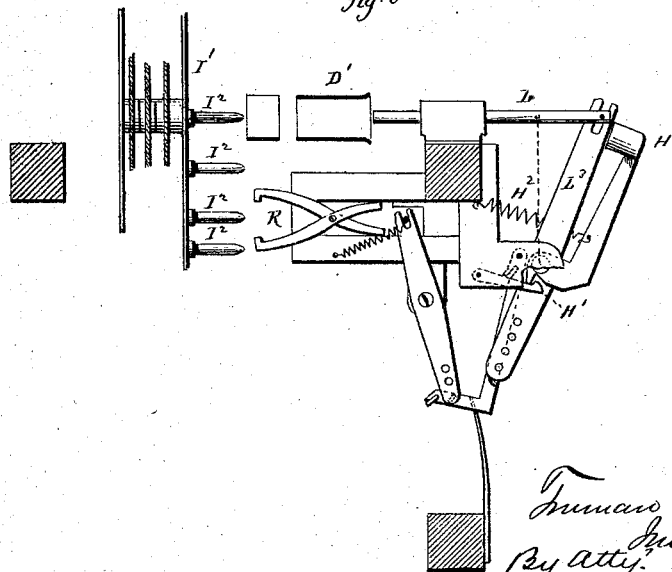

The first operation upon the blank after introduction to the holders is to drill or bore the end for the introduction of the tool. To do this a series of boring-tools are arranged in successive spindles G $G^1$ $G^2$ $G^3$, more or less in number. To each of the spindles a rapid rotary movement is imparted, as hereinafter described. The spindles are arranged corresponding to the blank-holders on the wheel D, so that the blanks in revolving will be successively presented in front of the boring-tools which said spindles carry. A longitudinal reciprocating movement is imparted to these spindles from a cam, $G^4$, through a lever, $G^5$, and this reciprocating movement is made during the time that the blank-holding wheel D is stationary; hence, each blank will be successively operated by the tools in the said several spindles and the end properly bored. The last spindle $G^3$ is fitted with a hollow mill, $G^6$, which cuts into the end of the blank, and sizes the end and forms the shoulder to receive the ferrule, as seen in section, Fig. $4^b$, and in end view, Fig. $4^c$. This done, the blank is ready for the surface forming. Parallel to the shaft C a shaft, I, is arranged, carrying a wheel, $I^1$. In this wheel several spindles, $I^2$, are arranged, to each of which a rapid revolving movement is imparted, as hereinafter described. To the wheel $I^1$ an intermittent rotary movement is given by means of a pawl, $I^3$, working in a ratchet-wheel, $I^4$, corresponding to the movement of the wheel D, and the spindles $I^2$ in their rotation pass in axial line with the blanks, which are held in the blank-holder, and project toward the bored end of the blank, as seen in Fig. 6. The rest in both wheels occurs at the same time; hence, one blank-holder, $D^1$, as in Fig. 6, will present itself axially in front of one of the spindles $I^2$. In this position a slide, L, in rear of the blank-holder $D^1$, is moved forward by the action of a cam, $L^1$, through levers $L^2$ and $L^3$, as denoted in broken lines, Fig. 6. This forces the bored blank from the holder $D^1$ onto the corresponding spindle $I^2$ on the wheel $I^1$. The spindle is made angular, or provided with any suitable irregularity which will embed into the wood sufficiently to prevent the rotation of the blank on the spindle, and, in order to more perfectly accomplish the last object, I arrange a hammer, H, in line with the slide L, the said hammer caught and held back by a latch, H', (see Fig. 6,) and is held thus caught until the slide has been moved forward to transfer the blank. The latch is then thrown out by connection with the lever $L^3$, or otherwise, and a spring, $H^2$, attached to the hammer, brings the hammer against the end of the slide, giving it a blow of sufficient force to drive the blank onto its spindle $I^2$. Each successive movement of the two wheels D and $I^1$ presents a new blank to be thus transferred from the holders to the spindles. These spindles $I^2$, together with the boring-spindles G $G^1$ $G^2$ $G^3$, are caused to revolve by a band from a pulley, N, on a driving-shaft, $N^1$, a band or bands passing from the said pulley N over the pulleys on the spindles, as seen in Figs. 2, 3, and 4, and as indicated by the broken lines in Fig. 1, the band forced down by a spring, $N^2$, carrying a pulley, $N^3$. This arrangement will allow the spindles $I^2$, during a part of the revolution of the wheel $I^1$, to remain stationary, and this time occurs while the transfer from the blank-holders to the spindles is made, so that at this time the spindles $I^2$ are standing still. The first spindle $I^2$, having received its blank, and so each successive spindle, passes on by the intermittent movement and beneath the cutter-carriage P. This carriage P has a reciprocating movement across the machine on ways $P^1$. This movement is imparted to it by a cam, $P^2$, through a lever, $P^3$, its movement being from the position in Fig. 7 to that in broken lines, same figure, and is returned by a weight, $P^4$, or otherwise. This carriage carries several tools, T, which are held in adjustable tool-holders $T^1$. (See Fig. 7.) The tools come in contact with the wood of the revolving blank as they pass over it, and dress it to the form indicated by the movement of the carriage. On the frame are arranged formers $T^2$, representing the longitudinal surface of the handle. (See Fig. 3.) The carriage, in its movement, passes over these formers, the carriage rising and falling according to the irregularity of the formers. The tools, therefore, cut the surface of the blank according to these formers, and as denoted in Fig. 7.

Figure 7:
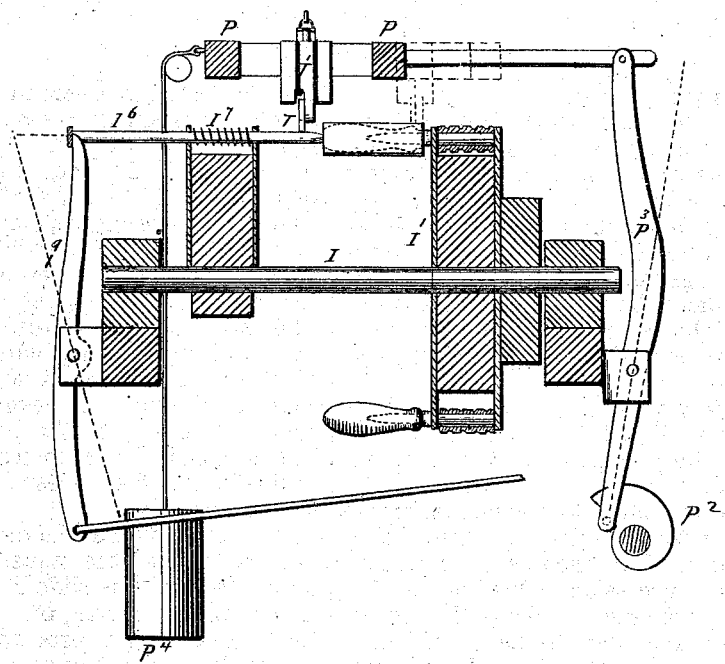

In order to more firmly support the blanks than can be done by the spindles $I^2$ alone, I arrange, in axial line with the spindles $I^2$, several spindles, $I^6$, which have a longitudinal movement only, and are forced forward toward the spindles $I^2$ by a spring, $I^7$. (See Fig. 7.) A cam, $I^8$, through a lever, $I^9$, serves to draw these spindles back, as denoted in broken lines, Fig. 7. As the spindles are successively presented for the operation of the tools, and before the tools commence their operation, these spindles spring forward and strike into the center in the end of the handle, as seen in Fig. 7, and thus form a bearing or center, around which the handles revolves, and so as to firmly support them.

After the tool has completed its work, the ends of the handles which have been held by the spindles $I^6$ require to be finished, and this is done by a burr, S, on a spindle, $S^1$, (see Fig. 3,) which has only a longitudinal movement, and that imparted to it by a cam, $S^2$, through levers $S^3$ and $S^4$. After the handle has passed the turning-tools, and in its next or subsequent positions, the burr S is brought against the end of the revolving handle, and the end of the handle thereby completely finished and ready to be discharged from the machine. After being thus finished the wheel $I^1$ passes on carrying the finished handle, and in one of its subsequent positions presents the handle to a pair of claws, R, (see Figs. 3 and 6,) which have a reciprocating movement imparted to them by the cam $R^1$, through a lever, $R^2$. The claws advance and close upon the handle, and, returning, draw the finished handle from the spindle and discharge it from the machine.

As there must necessarily be a shoulder or abrupt termination at the smaller end of the handle, I find it difficult to return the carriage back over this abrupt termination of the formers T². To aid in returning the carriage, I arrange a slide, W, (see Figs. 8 and 9,) parallel with the track on which the carriage moves, and in close proximity thereto, with stops W¹ at one end and W² at the other. The carriage will strike these stops at its two extremes, and impart to the slide W a short movement with the carriage. On this slide I form an upward-projecting lug, n, in position nearer the smaller end of the former T².

Figure 8:
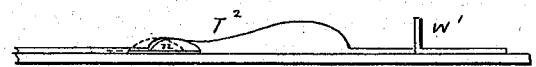
Figure 9:
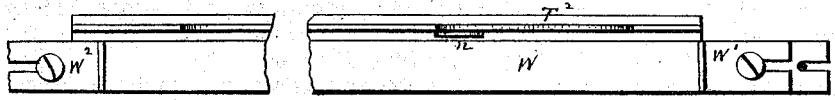

When the carriage commences its movement this lug lies back of the former, as seen in Fig. 8, and corresponds substantially to the shape of the former T², but without the abrupt termination. After the carriage has completed its work, it passes on still farther, striking the stop W², and carrying with it the slide W. This brings the lug n forward of the smaller end of the former T², and presents an easy incline, as seen in broken lines, Fig. 8, for the return of the carriage over the abrupt end of the former. As the carriage returns, it strikes the stop W¹ and brings the slide W, with the lug n, back to its first position.

The parts of the machine are made adjustable to adapt it to different lengths and sizes, in substantially the usual manner for similar machines.

I claim as my invention—

1. The combination of the hopper B, the wheel D, having an intermittent rotative movement, and provided with the blank-holders D¹ and the slide F, substantially as and for the purpose described.

2. The combination of the hopper B, the wheel D, having an intermittent rotative movement, and provided with the blank-holders D¹ and the slide F, with the finger f, spring F⁴, and incline F⁵, substantially as described.

3. The combination of the wheel D and its blank-holders D¹, the several spindles G G¹ G² G³, more or less in number, each carrying a drill, and having a combined rotary and reciprocating movement imparted thereto, with the hollow mill G⁶ for sizing the end of the handle, substantially as described.

4. In combination with the blank-carrying wheel D, having an intermittent rotative movement, and the wheel I¹, having a corresponding rotative movement, and provided with the revolving spindles I², the said wheels arranged relatively to each other, as described, the slide L, for transferring the blanks from the holders on the wheel D to the spindles on the wheel I¹, substantially as described.

5. The combination of the blank-carrying wheel D, having an intermittent rotative movement, and the wheel I¹, having a corresponding rotative movement, and provided with the revolving spindles I², the said wheels arranged relatively to each other, as described, the slide L, for transferring the blanks from the holders on the wheel D to the spindles on the wheel I¹, with the hammer H, substantially as and for the purpose specified.

6. In combination with the wheel I¹, having an intermittent rotative movement, and provided with the revolving spindles I², the auxiliary centering-spindles I⁶, substantially as and for the purpose specified.

7. In combination with the wheel I¹, having an intermittent rotative movement, and provided with the revolving spindles I² and the auxiliary centering-spindles I⁶, the carriage P, having a reciprocating movement substantially parallel with the axes of the spindles I², and carrying the cutters T and the formers or guides T², whereby the desired form is given to the handle, substantially as described.

8. The combination of the wheel I¹, having an intermittent rotative movement, and provided with the revolving spindles I², the auxiliary centering-spindles I⁶, the carriage P, having a reciprocating movement substantially parallel with the axes of the spindles I², and carrying the cutters T and the formers or guides T², whereby the desired form is given to the handle, with the burr S, for finishing the end of the handle, substantially as specified.

9. The combination of the wheel I¹, having an intermittent rotative movement, and provided with the revolving spindles I², the auxiliary centering-spindles I⁶, the carriage P, having a reciprocating movement substantially parallel with the axes of the spindles I², and carrying the cutters T and the formers or guides T², whereby the desired form is given to the handle, the burr S. for finishing the end of the handle, and the claws R, for removing the finished handles from the spindles I², substantially as specified.

10. The combination of the wheel I¹, having an intermittent rotative movement, and carrying the revolving spindles I², the carriage P, carrying the cutters T and the forming-guides T², the slide W, provided with lugs n, substantially as and for the purpose specified.

TRUMAN PIPER.

Witnesses:
  A. J. TIBBITS,
  J. H. SHUMWAY.